May 14, 1940.  E. BORREGARD  2,200,533
DISPLAY POSTER DEVICE
Filed Aug. 31, 1939  2 Sheets-Sheet 1
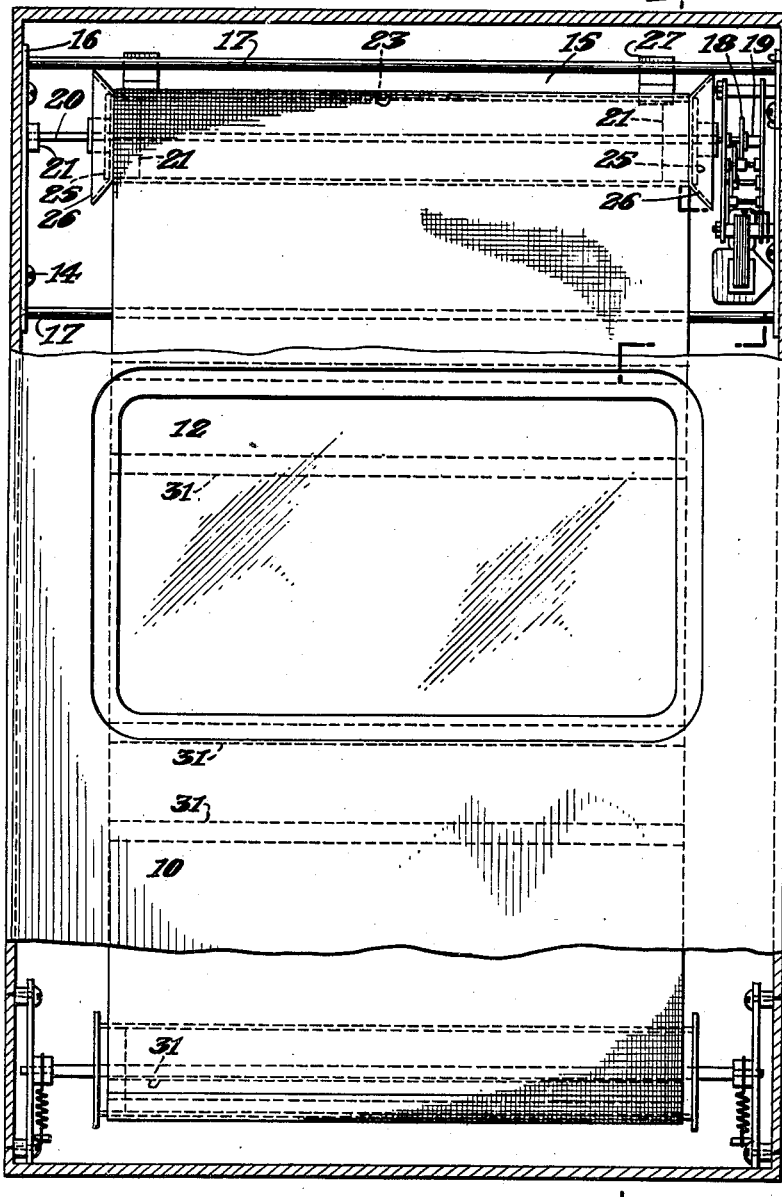
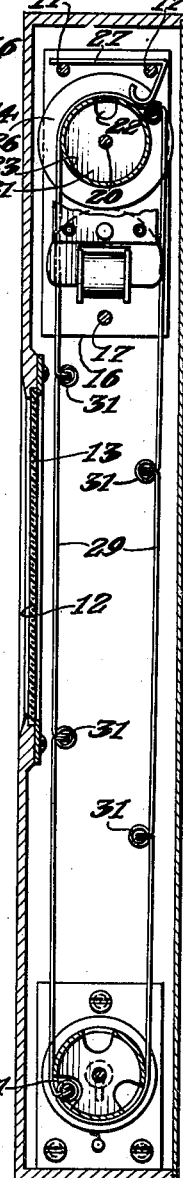
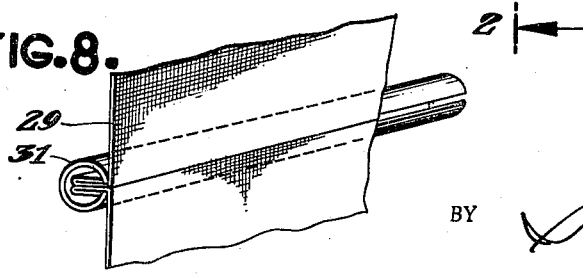
INVENTOR.
Ernst Borregard
BY Henry J. Lueke
ATTORNEY.

May 14, 1940. E. BORREGARD 2,200,533
DISPLAY POSTER DEVICE
Filed Aug. 31, 1939 2 Sheets-Sheet 2
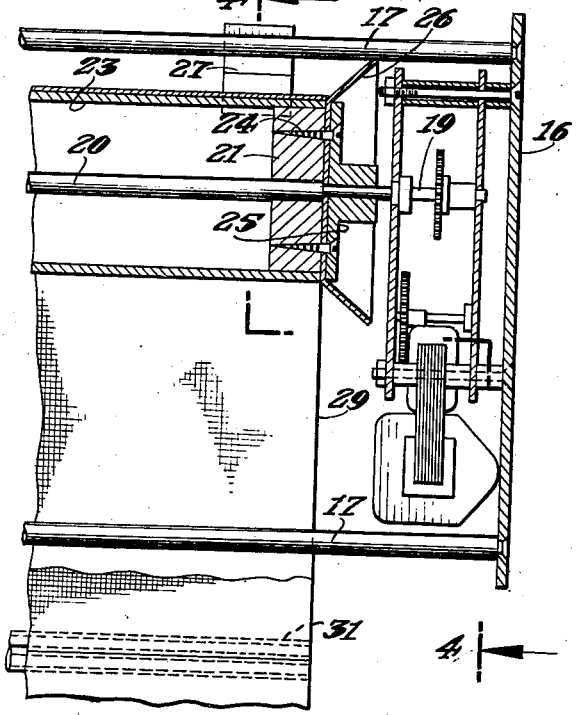
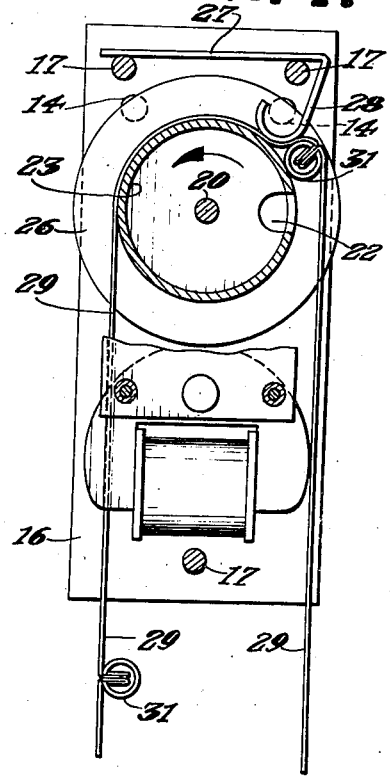
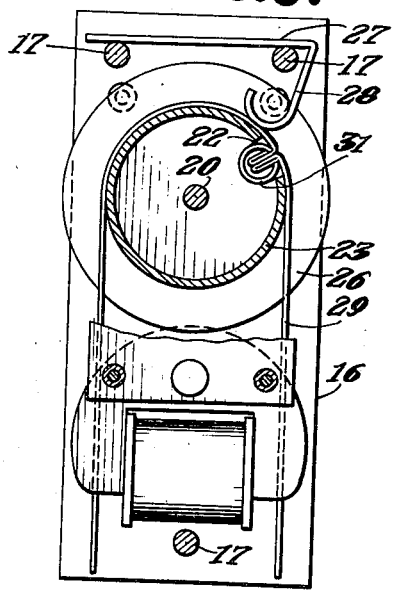
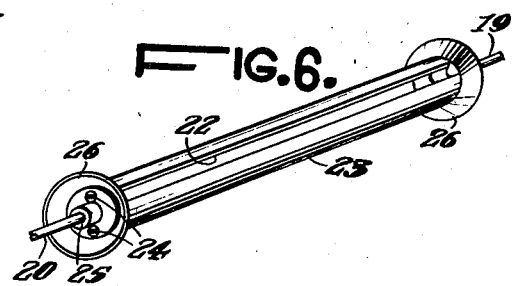
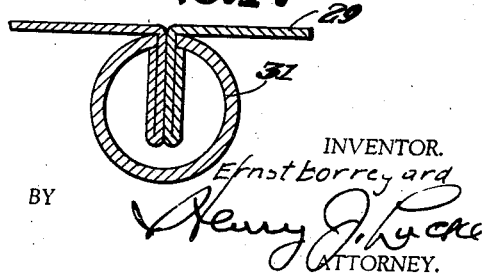
INVENTOR.
Ernst Borregard
BY
Henry J. Lycke
ATTORNEY.

Patented May 14, 1940

2,200,533

UNITED STATES PATENT OFFICE 2,200,533

DISPLAY POSTER DEVICE

Ernst Borregard, Woodmere, N. Y.

Application August 31, 1939, Serial No. 292,781

5 Claims. (Cl. 40—32)

My present invention relates to display devices and more particularly to an improved poster display device.

My present invention is specifically directed to that class of poster display devices in which the posters, of any desired size and number, are arranged on an endless belt or carrier, and such posters are successfully brought into operative relation with a display window through which the same may be viewed. The posters are held against movement for a predetermined length of time so as to enable the same to be viewed or read, and are then moved out of registry with the window to have the place thereof taken by the next succeeding poster on the endless belt. My invention is particularly directed to the features of construction which enable the device to be quickly, readily and economically made and assembled, and which will work accurately in the performance of its function. By my present invention I am able to eliminate the heretofore complicated gearing considered essential in devices of this character.

A feature of my invention therefore is an improved poster display device.

Another feature of my invention is an improved operating mechanism for permitting intermittent motion of an endless carrier having arranged thereon a plurality of posters.

A further feature of my invention is the improved means for insuring the positive operation of the poster carrying endless member.

Other features of the invention will appear as the description thereof progresses.

In the accompanying drawings:

Fig. 1 is a front elevation, partly in section, of a casing with which my improved device is associated;

Fig. 2 is a sectional side elevation on the line 2—2 of Fig. 1;

Fig. 3 is an enlarged view, in section, of the portion of the structure shown at the upper righthand corner of Fig. 1;

Fig. 4 is a sectional side elevation taken on the line 4—4 of Fig. 3, and illustrating the manner in which the endless poster display belt is brought to rest for the purpose of positioning a poster thereon in registry with a viewing sight or window in the casing shown in Fig. 1;

Fig. 5 is a view similer to Fig. 4, and illustrating the operation of the means for restarting the endless poster display belt in motion;

Fig. 6 is a perspective view of the remainder illustrated in the preceding figures;

Fig. 7 is a section through one of the means for dividing the endless poster carrier into panels or divisions, and Fig. 8 is a perspective view of the structure shown in Fig. 7.

Referring to the drawings, 10 designates a casing of any suitable material, as metal or wood, and of appropriate length and width as well as depth, and of such character as to be readily positioned in the most advantageous place for displaying a series of posters in succession. The casing 10 is provided with a front 11 having a sight opening or window 12 cut therein, such sight opening or window being of suitable dimensions. If desired the sight opening or window is provided with a sheet 13 of transparent material such as glass, Celluloid or the like.

Within the casing 10 adjacent to the top thereof and secured in position by any suitable means, as the screws 14, is a framework designated generally by the reference numeral 15 and composed of end plates 16 and rods 17. To one of the end plates 16 is secured a driving device 18. This driving device is preferably a clock mechanism such as a motor driven synchronous clock movement and as such may be connected to any suitable source of power supply to rotate the power delivery shaft 19 thereof at a constant rate of speed.

Secured to the power shaft 19 is one end of a shaft 20, and the other end of this shaft 20 is mounted for rotation in a bearing 21 fixed to the inner face of the other end plate 16. Intermediate the ends of the shaft 20 and spaced apart from each other are cylindrical hub members 21 and each of the hub members is provided with a cut-away portion 22, such cut-away portion being substantially U-shaped as shown in Fig. 2. The hubs 21 are enclosed in a cylindrical member 23 having a slot extending in a direction along its length so as to register with the cut-away portions 22 in the hubs 21. This construction provides a roller having a substantially U-shaped groove parallel to its axis of rotation. The dimensions of the cut-away portions 22 and cut-away slot in the cylindrical member 23 are proportioned to the dimensions of a device to be hereinafter described. At each end of the cylindrical member 23 and secured to the hubs 21 by screws 24 and end members 25 are the cone shaped members 26. The cone shaped members 26, together with the cylindrical member 23, constitute a roller the ends of which are outwardly flared as clearly shown in the drawings, and particularly in Fig. 6.

The rods 17 which extend between the end plates 16 are arranged preferably as shown in Fig. 4, that is, with two of such rods lying in the same or substantially the same horizontal plane and adjacent to the top of the plates 16. To such pair of rods 17 is secured by riveting, welding or in any other suitable manner the members 27. Such members 27 are arranged adjacent the ends of the cylindrical member 23, and such members are provided with downwardly extending members 28. The lower end of the downwardly extending members are rounded as clearly shown in Figs. 2, 4 and 5, and lie adjacent to the surfaces of the cylindrical member 23. The function of the downwardly extending members 28 will appear as the description of the invention progresses.

On the cylindrical member 23 is mounted the endless belt or carrier 29. The width of this endless belt or carrier is substantially that of the length of the cylindrical member 23. As the cylindrical member rotates the endless belt or carrier 29 travels with it at a speed equal to the peripheral speed of such cylindrical member 23, unless some means is utilized for stopping the movement of such endless belt or carrier.

The endless belt or carrier is divided into a number of sections or panels by the split cylindrical hollow bars 31. The cylindrical bars 31 may be utilized to connect the two ends of the material from which the endless belt or carrier 29 is formed, as shown in Figure 7, or may be utilized to define the limit of a panel by folding the material of the endless belt 29 transversely of its length to form a loop and sliding the cylindrical hollow bar 31 thereover. The outer diameter of the cylindrical hollow bars 31 is slightly less than the width of the groove formed by the cylindrical member 23 and the hubs 21. It will be apparent from an inspection of Fig. 5 for example that when a cylindrical hollow member 31 is in position in the slot above referred to, that the endless belt or carrier 29 will rotate with the cylindrical member 23, whereas it will be equally obvious from an inspection of Fig. 4 that if during the rotation of the cylindrical member 23 a cylindrical hollow bar 31 engages with the periphery of the cylindrical member 23 that the cylindrical hollow bar 31 will strike against the lower curved end of the downwardly extending members 28 and under these circumstances although the cylindrical member 23 will continue to rotate the endless belt or carrier 29 will remain in practically a position of rest. As the cylindrical member 23 rotates it will move from the position shown in Fig. 4 to that shown in Fig. 5. When this position is reached, the bar 31 will seat itself in the U-shaped slot, and it will be apparent therefore that under these circumstances the endless belt or carrier 29 will again take up its movement.

The cylindrical hollow bars 31 are so positioned on the endless belt or carrier 29 and the sight opening 12 in the casing 10 is so positioned relative to the position of the cylindrical member 23 that a panel or section of the endless belt or carrier will be in position to be viewed through the sight opening 12 when the cylindrical hollow bar 31 engages with the downwardly extending members 28.

The endless belt or carrier 29 may have its lower bight free. Under some circumstances however it may be desirable to have the lower bight engage with a roller similar to the cylindrical member 23. Such a construction is indicated in Figures 1 and 2 of the drawings but a detailed description thereof is not deemed necessary.

With the device constructed and assembled as above described and assuming the synchronous motor shown in the drawings to be in operation the cylindrical member 23 will rotate in a counter-clockwise direction and in such a manner as to bring the sections or panels of the endless belt or carrier 29 successively into operative relation with respect to the sight opening 12 in the casing 10. The synchronous motor operating constantly the cylindrical member 23 will likewise rotate constantly and at a definite fixed speed. The endless belt or carrier in its movement will bring the cylindrical hollow bars 31 successively into position shown in Figure 4, that is, into engagement with the downwardly extending members 28. This will bring the endless belt or carrier 29 to a stop, permitting the panel or section thereof in registry with the sight opening 12 to be viewed by an onlooker. The endless belt or carrier 29 will remain at rest until the slot or groove in the cylindrical member 23 comes into the position shown in Figure 5 whereupon the travel of the endless belt or carrier will be resumed.

Whereas I have described my invention by reference to specific forms thereof, it will be understood that many changes and modifications may be made without departing from the spirit of the invention.

I claim:

1. In an improved animated poster display device the combination of a frame, a roller mounted thereon, means for continuously rotating the roller, an endless belt divided into a plurality of panels on which are mounted the posters to be displayed, said endless belt being mounted on and rotatable with the roller, and means carried by the framework and the endless belt respectively, cooperating to intermittently halt the endless belt in its travel.

2. In an improved animated poster display device the combination of a frame, a roller mounted thereon, means for continuously rotating the roller, an endless belt divided into a plurality of panels on which are mounted the posters to be displayed, said endless belt being mounted on and rotatable with the roller, means carried by the framework and the endless belt respectively, cooperating to intermittently halt the endless belt in its travel, and means carried by the roller and cooperating with the means carried by the endless belt for restarting the endless belt in its travel after a predetermined length of time.

3. In an improved animated poster display device the combination of a frame, a roller mounted thereon, means for continuously rotating the roller, an endless belt divided into a plurality of panels on which are mounted the posters to be displayed, transverse members secured to the endless belt and defining the limits of the panels in the direction of length of the endless belt, stops mounted on the framework adjacent to the roller and in position to successively engage with the transverse members to thereby halt the endless belt in a position to bring the posters successively into viewing position, and a longitudinal groove formed in the periphery of the roller for receiving successively the transverse members defining the panels to thereby house said transverse members out of the path of the stops to thereby permit the resumption of motion on the part of the endless belt.

4. In an animated poster display device the combination of a casing having a window or sight opening formed therein, a framework mounted at the upper end of the casing, a roller mounted for rotation in said framework, means for continuously rotating the roller in a predetermined direction, an endless belt mounted on the roller, substantially cylindrical transversely arranged bars on the endless belt and dividing the same into a plurality of panels on which the posters to be displayed are mounted, a longitudinal groove formed in the roller and of a dimension to house the substantially cylindrical transversely arranged members, stop means mounted on the frame and adapted to successively engage with the transverse members as the endless belt moves onward over the roller to thereby bring the endless roller to rest with a panel in position to be viewed through the sight opening or window, the longitudinal groove in the roller being brought into position to receive the transverse member in engagement with the stop members after a predetermined length of time to thereby house the transverse member and permit the endless belt to resume its movement.

5. In an animated poster display device the combination of an endless belt divided into a plurality of panels by transversely arranged bars carried by the endless belt, a roller on which said endless belt is mounted, means for rotating the roller continuously in one direction, a stop member associated with the roller and defining a passage through which the transverse members can not pass, a longitudinal groove formed in the roller and adapted to house the transverse members to thereby permit the transverse members to successively pass beyond the stop member, said stop member, roller and longitudinal groove constituting means for intermittently stopping said endless belt for a predetermined length of time.

ERNST BORREGARD.